(12) United States Patent
Eagle et al.

(10) Patent No.: US 10,047,250 B2
(45) Date of Patent: Aug. 14, 2018

(54) ADHESIVE COMPOSITION WITH GLASS SPHERES

(71) Applicant: Dow Global Technologies LLC, Midland, MI (US)

(72) Inventors: Glenn G. Eagle, Bloomfield Hills, MI (US); Andreas Lutz, Galgenen (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/325,237

(22) PCT Filed: Nov. 3, 2015

(86) PCT No.: PCT/US2015/058716
§ 371 (c)(1),
(2) Date: Jan. 10, 2017

(87) PCT Pub. No.: WO2016/077094
PCT Pub. Date: May 19, 2016

(65) Prior Publication Data
US 2017/0240778 A1    Aug. 24, 2017

Related U.S. Application Data

(60) Provisional application No. 62/077,955, filed on Nov. 11, 2014.

(51) Int. Cl.
C08K 7/16        (2006.01)
C09J 11/04       (2006.01)
C08K 7/20        (2006.01)
C09J 163/00      (2006.01)

(52) U.S. Cl.
CPC ............. *C09J 11/04* (2013.01); *C08K 7/20* (2013.01); *C09J 163/00* (2013.01); *C08K 2201/003* (2013.01); *C08K 2201/005* (2013.01); *C09J 2205/102* (2013.01); *C09J 2463/00* (2013.01)

(58) Field of Classification Search
CPC ............ C09J 11/04; C09J 163/00; C08K 7/20
See application file for complete search history.

(56) References Cited

U.S. PATENT DOCUMENTS

| 5,250,591 | A  | * | 10/1993 | Fujii ................... C08F 299/024 522/117 |
| 5,278,257 | A  |   | 1/1994  | Mulhaupt et al. |
| 7,473,717 | B2 |   | 1/2009  | Muenz et al. |
| 7,910,656 | B2 | * | 3/2011  | Lutz ....................... C09J 163/00 525/113 |
| 7,919,555 | B2 | * | 4/2011  | Agarwal et al. |
| 9,840,070 | B2 | * | 12/2017 | Jialanella ............ B32B 37/1284 |
| 2007/0293603 | A1 |   | 12/2007 | Shepherd et al. |
| 2011/0297317 | A1 | * | 12/2011 | Lutz ....................... C09J 163/00 156/330 |
| 2013/0233485 | A1 | * | 9/2013  | Herr .......................... C09J 9/02 156/307.1 |
| 2017/0022402 | A1 | * | 1/2017  | Lutz .......................... C09J 5/06 |
| 2017/0197397 | A1 | * | 7/2017  | Jialanella ............ B32B 37/1284 |
| 2017/0204301 | A1 | * | 7/2017  | Eagle ....................... C09J 11/08 |
| 2017/0292049 | A1 | * | 10/2017 | Jialanella ............... C09J 163/00 |
| 2017/0335147 | A1 | * | 11/2017 | Lutz ....................... C08G 59/56 |
| 2017/0349795 | A1 | * | 12/2017 | Balijepalli ............... C09J 11/08 |

FOREIGN PATENT DOCUMENTS

| EP | 1051961 A1     | 11/2000 |
| EP | 1995282 A1     | 11/2008 |
| WO | 200378163 A1   | 9/2003  |
| WO | 2012091842 A2  | 7/2012  |

* cited by examiner

*Primary Examiner* — Hannah J Pak

(57) ABSTRACT

A new adhesive composition containing glass beads and having unique properties in automotive related applications. The method of making such new adhesive composition.

4 Claims, No Drawings

ADHESIVE COMPOSITION WITH GLASS SPHERES

FIELD OF THE INVENTION

The present invention relates to a new adhesive composition having unique properties in automotive related applications.

INTRODUCTION

Epoxy resin-containing adhesives are widely used in automotive industries. When the adhesive composition has a Young's modulus value above 1000 MPa, some modification to the adhesive composition is needed in order to achieve acceptable cohesive failure. These modifications can create an apparent increase in toughness due to keeping the crack propagation away from the substrate interface.

Invariably as the adhesive composition is modified with inorganic filler to improve failure mode, more rubber may be required to offset a loss of toughness due to the inorganic filler addition. This increases cost and lowers cross link density which is not ideal for corrosion resistance. Common methods to achieve good failure mode include the use of talc and chlorite fillers. Cashew nutshell oil can also be used but it has the same issues as talc. Blowing agents may also be used but with many negative side effects. Because of the difficulty of maintaining desired impact peel performance, many benefits of higher filler loadings are avoided when formulating high impact peel performing epoxy containing adhesive compositions. The benefits of fillers in epoxy adhesive compositions include superior rheology control and improved corrosion resistance. Inorganic filler loadings typically improve corrosion resistance due to blocking the ingress of moisture into the bond line. However, filler loadings of 20 to 40% by volume of the composition are avoided due to the negative effect on impact peel performance.

It was surprising to find that spherical glass or ceramic beads of appropriate particle size can induce good cohesive failure mode and many other good properties to the adhesive compositions without the negative effects of talc and chlorite fillers.

SUMMARY OF THE INVENTION

The present invention provides a new adhesive composition that comprises 1 to 10 wt %, preferably 1 to 7 wt % and more preferably 4 to 6 wt %, based on the total weight of the composition, of glass beads. In a preferred embodiment, such glass beads are spherical and have an average diameter of no more than 110 micrometers, preferably about 50 to 75 micron meters, more preferably 60 to 75 micrometers with 90% of the glass beads having a size distribution between 5 to 200 microns but more preferably between 25 and 105 microns. The adhesive composition also contains other typical components: epoxy resin(s), curing agent such as dicyandiamide, catalyst such as blocked tertiary amine or urea, fumed silica, tougheners such as urethane rubbers, optionally auxiliary tougheners such as carboxyl terminated butadiene-acrylonitrile (CTBN) epoxy adducts and/or ethylene/butylenes oxide di block copolymer, epoxy silane and other fillers such as calcium carbonate, calcium oxide, calcium metasilicate etc.

DETAILED DESCRIPTION OF THE INVENTION

The present invention provides an adhesive composition comprising glass beads to improve cohesive failure and other properties of the composition. Like an ordinary base adhesive composition, it will contain such conventional components: epoxy resin(s), curing agent such as dicyandiamide, catalyst such as blocked tertiary amine or urea, fumed silica, tougheners such as urethane rubbers, optionally auxiliary tougheners such as carboxyl terminated butadiene-acrylonitrile (CTBN) epoxy adducts and/or ethylene/butylenes oxide di block copolymer, epoxy silane and other fillers such as calcium carbonate, calcium oxide, calcium metasilicate etc. Instead of using talc and chlorites to maximize T-Peel failure mode and impact performance, glass beads are used without or with lowered amounts of talc and chlorites in the same adhesive compositions. The use of glass beads in the place of traditionally used inorganic fillers not only resulted in better composition performances but also significantly reduced the cost of making adhesive compositions. Some commercial examples of the base adhesive compositions, into which modification can be made with glass beads, include BETAMATE™ Series 1486, 1090G, 1485, 1696, available from The Dow Chemical Company.

The adhesive composition of the present invention comprises glass beads, preferably hollow spherical glass beads with an average diameter of no more than 110 micrometers, preferably around 50 to 75 microns, and more preferably 60 to 75 microns with 90% of the glass beads having a size distribution between 5 to 200 microns but more preferably between 25 and 105 microns. One commercially available example of the preferred glass beads are Q-Cel™ from Potters Industries Inc. with an average diameter of 75 microns. The particle size distribution shows that 93% is below 125 microns in size, a density of 0.27 g/cc, and an isostatic crush strength of 750 psi. Another example is K25 glass beads available from 3M with an average diameter of 50 micron and 80% of it between 25 and 90 microns, a density of 0.25 g/cc and the isostatic crush strength of 750 psi. The Q-Cel glass beads are reportedly made from normal soda lime borosilicate with a lower melting point of 400° C. The K25 glass beads are reportedly made from the borosilicate glass with a melting temperature of 600° C.

In a preferred embodiment, glass beads are added while making the base adhesive composition via a simple "add and mix" and in the place of talc and chlorites or with reduced amounts of talc and chlorites typically used for the base adhesive compositions. After addition of the glass beads, the adhesive composition typically will comprise 1 to 10 wt %, preferably 1 to 7 wt % and more preferably 4 to 6 wt %, of the glass beads, all based on the total weight of the adhesive composition. Adhesive compositions with solid glass beads tend to have the same performance as the composition with hollow (hence low density) glass beads, such as K25. In one preferred embodiment, the adhesive composition comprises 10 to 20% in volume of spherical glass beads. In a more preferred embodiment, the adhesive composition comprises 10 to 15% in volume of spherical glass beads. Depending on different applications, some routine adjustment of volume and weight percentage of glass beads in an adhesive composition may be needed with the general guidance as described above.

While the present invention focused on glass beads, other beads whether solid or hollow, such as ceramic beads, should provide essentially the same benefits to the adhesive composition as glass beads.

To further improve the desired properties of the adhesive composition, some core shell rubber components may also be added to the adhesive composition but many of the preferred embodiments of the present invention do not contain such core shell rubber component.

EXAMPLES

The present invention can be further demonstrated with the following non-limiting examples. Sample A is a typical base adhesive composition of BETAMATE™ commercially available from The Dow Chemical Company. The process of making such compositions is known and was disclosed in detail in U.S. Pat. No. 5,278,257, incorporated herein in its entirety. Such typical base composition contains a certain amount of inorganic fillers such as talc and chlorites (e.g., Sierralite™ available from Imerys). Sample B is prepared in a similar manner as Sample A but instead of talc and chlorites, Sample B comprises same weight percentage of glass beads (e.g., Q-Cel from Potters Industries Inc). The difference of Samples A and B are summarized below:

TABLE 1

Preparation of Samples

|  | A | B |
| --- | --- | --- |
| Base Composition | 94% | 94% |
| Sierralite 252 | 6% |  |
| Q-Cel 7028 |  | 6% |
| Total wt % | 100 | 100 |

Testing Methods and Performance Observations

The samples were subjected to some mechanical performance tests and the test results are provided below.
Mechanical Testing
 Impact Peel is conducted per ISO11343
 T-Peel Test is conducted per ASTM D 1876
 Failure Mode is conducted visually to gauge the transition from adhesive failure to cohesive failure mode of the applied adhesive to a substrate. The scale is defined as:
 0 100% shiny metal substrate adhesive failure
 1 Practically all adhesive failure
 2 Starting to change to cohesive failure but still in both failure modes
 3 Mixed mode thick and thin cohesive failure
 4 Cohesive failure mostly thick failure mode
 5 Perfect thick cohesive failure through the center of the adhesive
The results are shown below in Table 2.

TABLE 2

Testing results of the Samples

|  | A | B |
| --- | --- | --- |
| T-Peel, N/mm | 5.2 | 7.0 |
| Failure Mode | 2 | 3 |
| Impact Peel, N/mm | 16.6 | 20.8 |

As shown in Table 2, Sample B with glass beads instead of talc and chlorites demonstrated better results in all three tested mechanical properties.

The invention claimed is:

1. An adhesive composition comprising 1 to 10 wt. %, based on total weight of the adhesive composition, of glass beads; wherein the glass beads have an average diameter of no more than 110 micrometers with 90% of the glass beads having a size distribution between 5 to 200 microns and wherein the adhesive composition further comprises a toughener comprising carboxyl terminated butadiene-acrylonitrile (CTBN) epoxy adducts and ethylene/butylenes oxide di block copolymer.

2. The adhesive composition of claim 1 wherein the adhesive composition further comprises one or more epoxy resins, a curing agent, a catalyst, fumed silica, and an epoxy silane.

3. The adhesive composition of claim 1 wherein the adhesive composition does not contain any added core shell rubber component.

4. The adhesive composition of claim 1 wherein the glass beads are in spherical form.

* * * * *